Nov. 29, 1938.  A. DAVIS, JR  2,138,399
VEHICLE BODY
Filed Nov. 15, 1932  3 Sheets-Sheet 1

INVENTOR
Augustine Davis, Jr.
BY
ATTORNEY

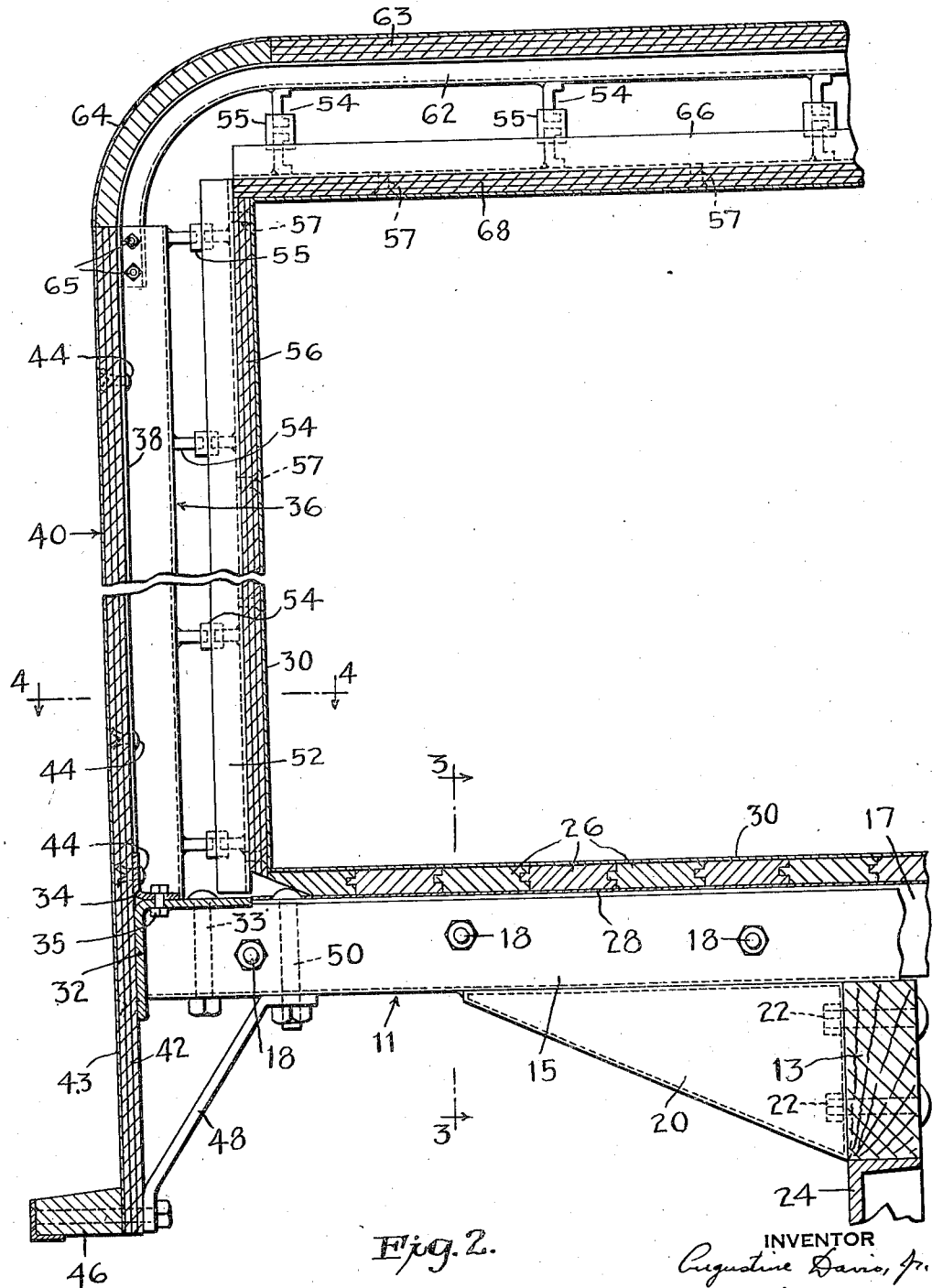

Nov. 29, 1938.  A. DAVIS, JR  2,138,399
VEHICLE BODY
Filed Nov. 15, 1932  3 Sheets-Sheet 3
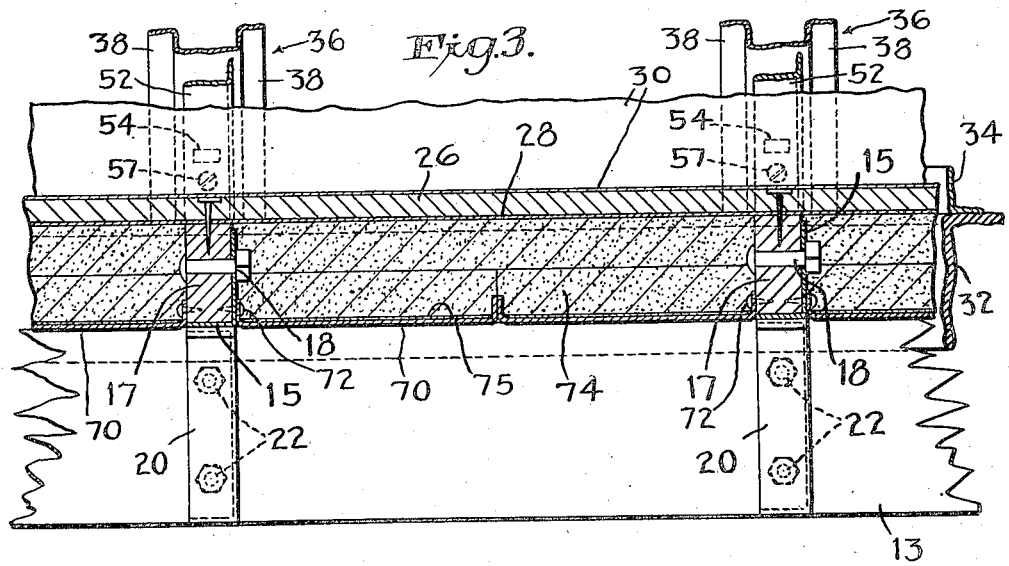
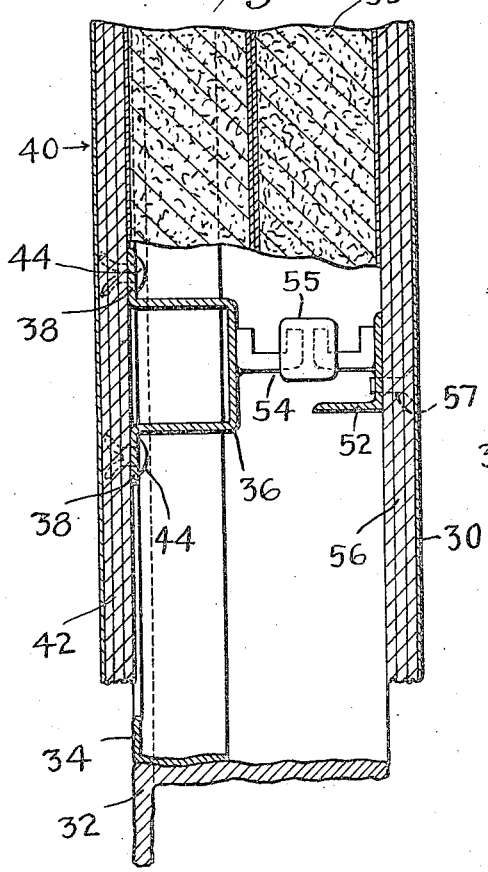
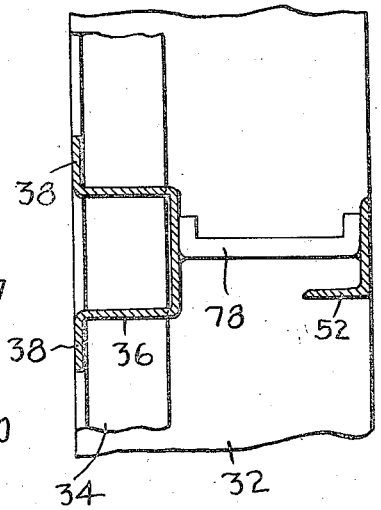
INVENTOR
Augustine Davis, Jr.
BY
ATTORNEY Patented Nov. 29, 1938

2,138,399

UNITED STATES PATENT OFFICE 2,138,399

VEHICLE BODY

Augustine Davis, Jr., Cincinnati, Ohio

Application November 15, 1932, Serial No. 642,701

3 Claims. (Cl. 296—38)

This invention relates to vehicle bodies for motor trucks or trailers.

An object of the invention is to provide an improved vehicle body construction having novel features and combinations of elements that reduce the weight of the body without sacrifice of strength, and make the construction economical to manufacture.

Another object of the invention is to provide a composite bolster for a vehicle body, which is light and strong and has braces for connection with the sills or frame on which the bolster is supported.

Another object is to provide a side and top wall construction for refrigerator type bodies in which a stiff outside panel or support is connected to a stiff inside panel or support by stays secured to both of the panels or supports to hold them in spaced relation and against relative movement. This construction has the advantage of great strength with little weight, and at the same time possesses the necessary flexibility for a vehicle body. For refrigerator bodies, the space between the inner and outer panels is filled with heat insulating material. By using stays of different length provision can be made for inserting any type and thickness of insulating material. The construction is particularly adapted for the manufacture of "knocked-down" bodies having the main floor deck and bolsters as one unit, the side and end panels as separate units, and the top deck as a separate unit, to be assembled at their destination to save freight charges.

Another object of the invention is to provide an improved heat insulating flood construction in which the insulating material is placed between the bolsters and supported from beneath by pans connected to the bolsters. The invention contemplates a waterproof covering over the floor insulation, and a floor over the waterproof material and connected to the bolsters.

Other objects, features and advantages of the invention will appear or be pointed out as the description proceeds.

In the accompanying drawings, forming a part hereof:

Fig. 2 is a fragmentary sectional view of a vehicle body with the same construction as Fig. 1, but showing the side wall continued up and joined to a top deck or roof. The insulating blankets are omitted from Fig. 2 in order to show the adjoining parts more clearly.

Fig. 3 is a fragmentary sectional view on the line 3—3 of Fig. 2.

Fig. 4 is an enlarged fragmentary sectional view on the line 4—4 of Fig. 2.

Fig. 5 is a view showing part of the structure of Fig. 4 with a modified form of stay.

Figure 1:
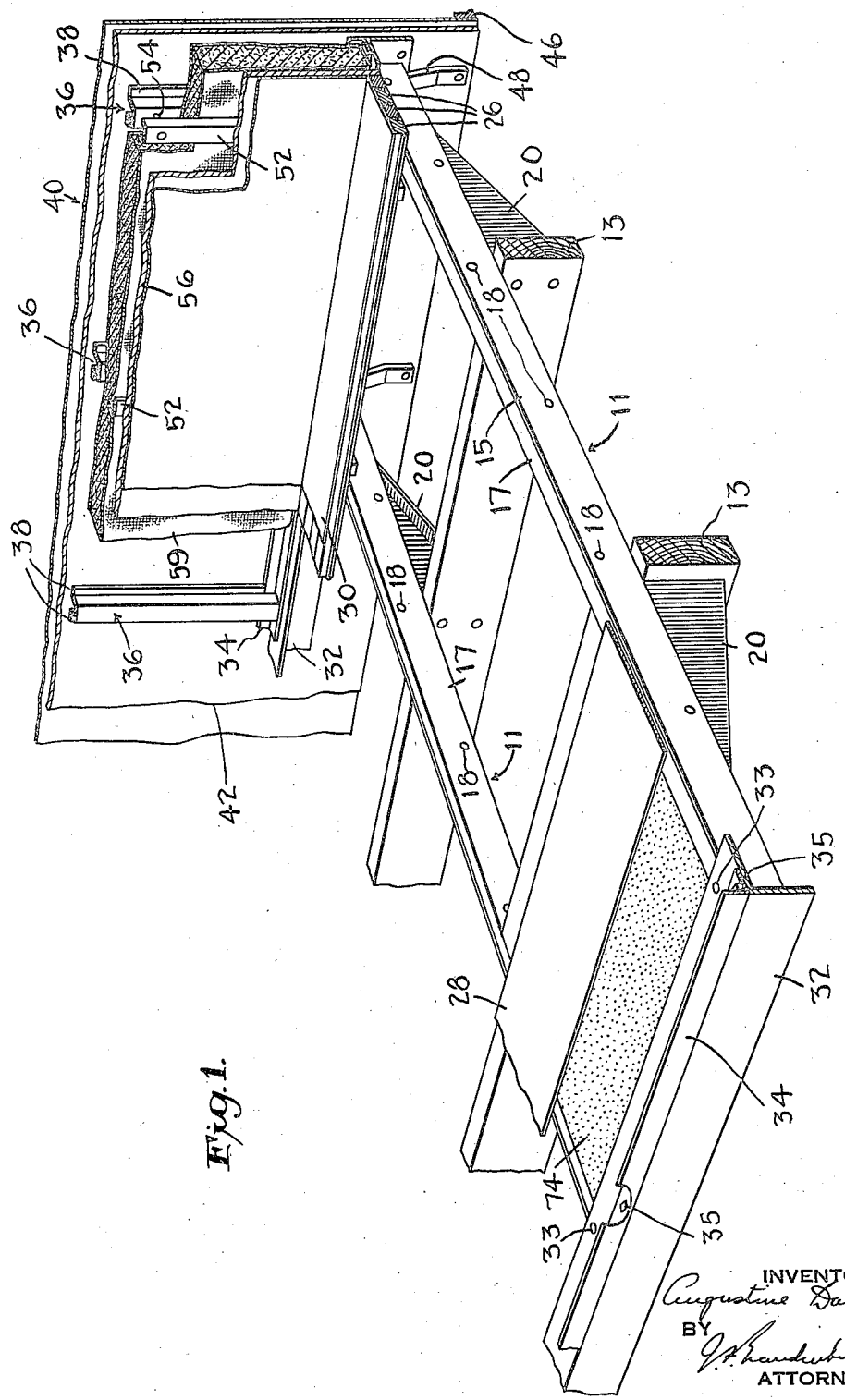
Fig. 1 is a fragmentary, perspective view, partly in section, of a vehicle body constructed in accordance with the invention.

A plurality of transversely extending bolsters 11 are supported at spaced points along the longitudinal sills 13 of a truck chassis. The composite construction of the bolsters is shown in Figs. 2 and 3. A sheet metal angle 15 is secured to a wooden beam 17 by bolts 18. The angle 15 covers the bottom and extends up one side of the beam, and the sheet metal of this angle 15 is of sufficient gauge to materially brace the wooden beam against bending. The nails for holding the floor are driven into the top face of the wooden beam 17. Triangular braces 20, having flanges along all three sides, are welded to the bottom face of the sheet metal angle 15, and the braces are secured to the sills 13 by bolts 22.

This bolster construction attains great strength with light weight. Tests show that it is very much stronger for its weight than the steel I-beams commonly used in freight bodies. It has a further important advantage over I-beam, or other metal bolsters, because the floor boards can be nailed to the wooden top face of this bolster whereas auxiliary wooden strips for receiving the nails are necessary with metal bolsters.

Fig. 2 shows the sill 13 resting on a chassis member 24 of a truck. When the body is mounted on a trailer, the bolsters are connected directly to the trailer chassis in the same manner as they are connected to the sills 13 when used with a truck. Thus, if the sills 13 in Fig. 1 are the longitudinal members of a trailer frame, this view illustrates the connection of the bolsters to the trailer chassis.

Floor boards 26 are nailed to the top faces of the bolsters, and in bodies having heat insulated floors a layer of waterproof paper 28 is used under the floor, this paper covering the bolsters and insulating material. For many purposes it is desirable to have the inside of the body lined with sheet metal 30.

An angle 32 is connected to the end of each bolster by a bolt 33, and this angle 32 extends along the length and width of the body. The bolsters 11, flooring 26 and angle 32 comprise the floor deck of the body. A light angle 34 is fastened to the upper side of the angle 32 and also extends along the length and width of the body. By connecting the light angle 34 to the angle 32 with bolts 35, the construction permits the building of a knocked-down truck or trailer body having the side walls as separate units from the floor deck, these units being shipped separately and bolted together at their destination to save freight charges. In bodies assembled at the factory it is more economical to use rivets in place of the bolts 35 and either type of fastening means allows the necessary flexibility for weaving of the body in use.

Upright carlines 36 are of channel cross-section and have the edges of the open side of the channel bent outwardly to provide flanges 38 for contact with the outside panel of the body. The bottom ends of the carlines are welded to the angle 34. The outside panel 40 is fastened to the angle 34, and to the flanges 38 of the upright carlines 36.

The panel 40 shown in Fig. 2 comprises three layers of plywood 42 covered by an outside layer of sheet metal 43. Bifurcated rivets 44 are driven through rivet holes in the angle 34 and upright carlines 36, and through the plywood, but when the rivets strike the sheet metal 43, the bifurcated ends spread and hold the rivet securely in the panel. Any other type of side panel can be used with the invention. The carlines 36, and the manner in which they are connected to the angle 34 and outside panel 40, are similar to the construction shown in my copending application Serial No. 612,671, filed May 21, 1932.

A rub rail 46 is attached to the lower end of the side panel 40. A brace 48 is connected to the lower end of the side panel at one end, and is connected at its other end to the bolster 11 by a bolt 50.

A vertically extending angle 52 is supported by each of the upright carlines 36. Each of these vertically extending angles 52 is connected to its supporting carline 36 by stays 54 which are welded or otherwise rigidly connected at their opposite ends to the carline 36 and vertically extending angle 52, respectively.

Each stay 54 is made of two metal ends connected to a molded block 55 of heat insulating material. This composite stay is a rigid unit, but the molded block prevents the transfer of heat through the metal of the stay.

An inside panel 56 is attached to the angles 52 by screws 57. The space between the outside panel 40 and inside panel 56 is filled with heat insulating material, such as insulating blankets 59. The blankets are shown in Figs. 1 and 4.

The carlines 36 are rigid supports to which the outside panel is connected, while each vertically extending angle 52 is a rigid support for holding the inside panel. The stays 54 and these rigid supports comprise a side wall frame unit of boxlike stiffness and great strength with light weight. The inner panel might be directly connected to the stays in place of the angles 52, but such a construction would be undesirable in manufacturing.

A ceiling carline 62 is connected to the top of each upright carline 36, and roof panels 63 and 64 are supported by the ceiling carline. Bolts 65 are used to fasten the ceiling carline 62 to the upright carline 36 in the case of bodies designed to be knocked down for shipment. When the bodies are permanently assembled at the factory, rivets or welding are more economical than bolts.

A ceiling angle 66 is connected to the ceiling carline 62 by stays 54 and a ceiling panel 68 is connected to the angle 66 in the same way as the inside panel 56 is connected to the angles 52. The space between the ceiling panel 68 and the roof panels 63 and 64 is filled with heat insulating material on the refrigerator bodies.

The insulated floor construction is shown in detail in Fig. 3. A sheet metal pan 70 extends between each bolster 11 and the next succeeding bolster, and is connected to the bolsters by nails 72. Heat insulating material 74 is placed in each of the pans 70 and fills the space between the bolsters, the top surface of the insulating material being substantially flush with the top faces of the bolsters. Cork blocks, cut to fit the space between the bolsters, are a desirable insulating material. In Fig. 3 the pans 70 are lined with waterproof paper 75.

The insulating material 74 is protected from liquids leaking through the floor by the waterproof paper 28, or other suitable waterproof covering.

The modified form of stay 78 shown in Fig. 5 is a continuous metal member which is connected at its opposite ends to the upright carline 36 and vertically extending angle 52. This simplified form of stay permits some heat to leak through the insulated side wall by conduction through the metal of the stay, but the amount of heat conducted by these stays is not large because of their limited cross-section.

The preferred embodiment of the invention has been described, but changes and modifications can be made and various features of the invention can be used alone or in combination with other features without departing from the invention as defined in the appended claims.

I claim:

1. A floor construction for a vehicle refrigerator body comprising a plurality of spaced bolsters extending transversely of the body, a pair of longitudinal sills extending longitudinally of the body and supporting thereon each of the bolsters, a stiff pan disposed in the space between each pair of successive bolsters, said pans each having a bottom disposed in the plane of the lower end of the bolsters and resting on the longitudinal sills and each pan having an upstanding flange along the sides thereof to engage the adjacent faces of the bolsters, means for securing the pan flanges to the bolsters, blocks of heat-insulating material disposed in each pan and having their upper surfaces substantially flush with the upper surface of the bolsters, and flooring above the insulating material secured to the said bolsters whereby the weight is disposed on the bolsters and not on the pans.

2. A floor construction for a vehicle refrigerator body comprising a plurality of spaced bolsters extending transversely of the body, a pair of longitudinal sills extending longitudinally of the body and supporting thereon each of the bolsters, a stiff pan disposed in the space between each pair of successive bolsters, said pans each having a bottom disposed in the plane of the lower end of the bolsters and resting on the longitudinal sills and each pan having an upstanding flange along the sides thereof to engage the adjacent faces of the bolsters, means for securing the pan flanges to the bolsters, blocks of heat-insulating material disposed in each pan and having their upper surfaces substantially flush with the upper surface of the bolsters, flooring above the insulating material secured to the said bolsters whereby the weight is disposed on the bolsters and not on the pans, and a waterproof paper covering for the heat-insulating blocks and bolsters disposed beneath the flooring.

3. A floor construction for a vehicle refrigerator body comprising a plurality of spaced bolsters extending transversely of the body, a pair of longitudinal sills extending longitudinally of the body and supporting thereon each of the bolsters, a stiff pan disposed in the space between each pair of successive bolsters, said pans each having a bottom disposed in the plane of the lower end of the bolsters and resting on the longitudinal sills and each pan having an upstanding flange along the sides thereof to egage the adjacent faces of the bolsters, means for securing the pan flanges to the bolsters, blocks of heat-insulating material disposed in each pan and having their upper surfaces substantially flush with the upper surface of the bolsters, flooring above the insulating material secured to the said bolsters whereby the weight is disposed on the bolsters and not on the pans, and a metallic body liner disposed on the upper surface of the flooring.

AUGUSTINE DAVIS, Jr.